US006769239B1

(12) United States Patent
Webb (10) Patent No.: US 6,769,239 B1
(45) Date of Patent: Aug. 3, 2004

(54) NON-TRASH SENSITIVE ROTOR KNIFE GUIDE PLATES

(75) Inventor: Bryant F. Webb, Ephrata, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 10/382,870

(22) Filed: Mar. 7, 2003

(51) Int. Cl.$^7$ .............................................. A01D 75/00
(52) U.S. Cl. ........................................................ 56/341
(58) Field of Search .............................. 56/341; 100/88

(56) References Cited

U.S. PATENT DOCUMENTS

| | | | |
|---|---|---|---|
| 4,258,540 A | | 3/1981 | Munro |
| 4,516,390 A | | 5/1985 | Klinner |
| 4,525,991 A | | 7/1985 | Naaktgeboren |
| 4,751,810 A | | 6/1988 | Naaktgeboren et al. |
| 4,955,188 A | * | 9/1990 | von Allworden ............. 56/341 |
| 5,052,171 A | | 10/1991 | Bich et al. |
| 5,419,108 A | | 5/1995 | Webb et al. |
| 5,447,022 A | | 9/1995 | Webb |
| 5,450,704 A | * | 9/1995 | Clostermeyer ................ 53/118 |
| 5,519,990 A | * | 5/1996 | Rodewald et al. ............. 56/341 |
| 5,595,055 A | | 1/1997 | Horchler, Jr. et al. |
| 5,787,694 A | * | 8/1998 | Tertilt et al. .................. 56/14.5 |
| 5,802,825 A | | 9/1998 | Chow et al. |
| 5,819,515 A | | 10/1998 | Ratzlaff et al. |
| 5,819,517 A | * | 10/1998 | Amanatidis et al. .......... 56/341 |
| 5,826,418 A | | 10/1998 | Clostermeyer et al. |
| 5,848,523 A | | 12/1998 | Engel et al. |
| 5,899,054 A | * | 5/1999 | Hawlas et al. ................. 56/341 |
| 5,974,776 A | * | 11/1999 | Prellwitz ...................... 56/504 |
| 6,012,271 A | | 1/2000 | Wilkens et al. |
| 6,029,434 A | | 2/2000 | Ratzlaff et al. |
| 6,128,995 A | * | 10/2000 | Geng ........................... 83/601 |
| 6,164,050 A | | 12/2000 | Vande Ryse et al. |
| 6,279,304 B1 | | 8/2001 | Anstey et al. |
| 6,298,646 B1 | | 10/2001 | Schrag et al. |
| 6,314,708 B1 | | 11/2001 | Engel |
| 6,314,709 B1 | | 11/2001 | McClure et al. |
| 6,370,851 B1 | * | 4/2002 | Uros et al. ................ 56/10.2 R |
| 6,370,856 B1 | | 4/2002 | Engel |
| 6,394,893 B1 | | 5/2002 | Scholz et al. |
| 6,594,983 B1 | * | 7/2003 | Krone et al. .................. 56/341 |

* cited by examiner

Primary Examiner—Thomas B. Will
Assistant Examiner—Alicia Torres
(74) Attorney, Agent, or Firm—John William Stader; Collin A. Webb (57) ABSTRACT

An agriculture baler having a bale-forming mechanism; a pick-up assembly disposed forward of the bale-forming mechanism to pick up a cut crop material and convey the crop material towards the bale mechanism, the pick-up assembly having: (a) a pick-up apparatus; (b) a conveying rotor disposed to receive cut crop material from the pick-up apparatus and to move the cut crop material towards the bale forming mechanism; (c) a floor having a first slot formed therein; (d) a cutting mechanism including a first knife disposed to rotate from a first resting position to a second cutting position extending through the first slot in the floor; and (e) a first guide plate disposed adjacent to the first slot.

8 Claims, 6 Drawing Sheets

NON-TRASH SENSITIVE ROTOR KNIFE GUIDE PLATES

FIELD OF THE INVENTION

The present invention pertains generally to agricultural balers used to form a bale of cut crop material. More particularly, the present invention relates to balers that have a pick-up assembly that includes a cutting mechanism for cutting the cut crop material into smaller pieces before the bale is formed. Specifically, the present invention is directed to improvements in the baler's pick-up assembly that includes the cutting mechanism by providing guide plates to stabilize and protect cutting knives of the cutting mechanism.

BACKGROUND OF THE INVENTION

Agricultural balers are machines that pick up a cut crop material typically arranged in windrows on the ground and form packages of the cut crop material known as bales. There are generally two types of balers: round balers and square balers. Round balers pick up the cut crop material and form round bales, such as disclosed in U.S. Pat. No. 6,394,893 to Scholz et al, which is incorporated herein by reference in its entirety. Square balers pick up the cut crop material and form square bales, such as disclosed in U.S. Pat. No. 6,298,646 to Schrag et al., which is incorporated herein by reference in its entirety.

Balers typically have a hitch, and, in operation, are hitched to and pulled by a tractor. The tractor provides power through hydraulic conduits to operate the mechanism of the baler. Because they perform a baling operation, both round and square balers have similar features, although their structures may be different. For instance, balers tend to include a pick-up assembly and a bale forming mechanism. The pick-up assembly includes a pick-up apparatus and a conveying apparatus, and serves to pick up the cut-crop material from the ground and direct it towards the bale forming mechanism. The pick-up apparatus includes a plurality of rotating tines that catch and drag cut crop material off of the ground and to the conveying apparatus. A pair of augers may help direct the cut crop material towards the center of the pick-up assembly where the conveying apparatus is located. The conveying apparatus then moves the cut crop material further along in the pick-up assembly.

In round balers, the conveying apparatus generally moves the cut crop material towards an opening (also called the "throat") in the bale forming chamber of a round bale forming mechanism. In square balers, the conveying apparatus moves the cut crop material into a duct that leads to the baling chamber of a square bale forming mechanism.

In both round balers and square balers, the conveying apparatus can be a rotor that rotates to move the cut crop material from the pick-up apparatus towards the bale forming mechanism. When a rotor is used, a cutting mechanism that includes an array of crop cutting knives can be disposed in slots in the floor of the pick-up assembly so that each knife can rotate from a resting position in or under the floor to an extended position, wherein the cutting edge of each knife is directed to engage the oncoming flow of cut crop material when in the extended position. In this way, each knife in the array of knives engages the flow of cut crop material and further cuts the crop material into even smaller pieces before the cut crop material enters the bale forming mechanism. The main advantage to having the array of knives for cutting the cut crop material into even smaller pieces is that the cut crop material will be easier for farm animals to chew and digest when the crop is used as farm animal feed.

However, the cutting mechanism of the prior art pick-up assemblies for round balers and for square balers has several drawbacks. First, errant cut crop material, or "trash" as it is sometimes called, can flow into the slots in the floor of the pick-up assembly and clog up the slot. When this happens, the knife gets stuck in the resting position because of the impacted trash in the slot that prevents the knife from rotating into the extended position. Second, when the knives rotate from the protection of the slot into the exposed extended position, each knife is relatively susceptible to undesirable lateral torque exerted on the sides of the knife by the flow of cut crop material. This undesirable lateral torque can bend the knife or tender the knife less effective as it wobbles in the flow of cut crop material. Therefore, there is a need for a feature of the pick-up assembly that will decrease the likelihood that the knife slots will become impacted with errant cut crop material and that will stabilize each knife in the stream of cut crop material when in the extended position.

Accordingly, it is an object of the present invention to overcome the disadvantages of pick-up assembly cutting mechanisms of the prior art square and round balers while maintaining the advantages of these machines.

Another object of the present invention is to provide a mechanism to avoid any knife becoming trapped by impacted errant cut crop material.

Another object of the present invention is to provide a mechanism that protects knives from damage by lateral torque exerted by the flow of the cut crop material.

Another object of the present invention is to provide a mechanism that stabilizes knives in the extended position to avoid a knife wobbling as cut crop material streams past, and engages with, each knife.

Another object of the present invention is to provide agricultural balers with a pick-up assembly having a cutting mechanism that is practical and cost effective to manufacture.

Another object of the present invention is to provide agricultural balers with a pick-up assembly having a cutting mechanism that is durable, operated reliably, and is easy to maintain.

SUMMARY OF THE INVENTION

In accordance with the above objectives, there is provided an agricultural baler comprising a bale-forming mechanism; and a pick-up assembly disposed forward of the bale-forming mechanism to pick up a cut crop material and convey the crop material towards the bale forming mechanism. The pick-up assembly includes (a) a pick-up apparatus; (b) a conveying rotor disposed to receive cut crop material from the pick-up apparatus and to move the cut crop material towards the bale forming mechanism; (c) a floor having a first slot formed therein; (d) a cutting mechanism including a first knife disposed to rotate from a first resting position to a second cutting position extending through the first slot in the floor; and (e) a first guide plate disposed adjacent a first side of the first slot.

In accordance with a second embodiment of the invention, the pick-up assembly includes a second guide plate disposed adjacent to a second side of the first slot so that at least a portion of the first slot is disposed between the first guide plate and the second guide plate.

In accordance with a third embodiment of the invention, the floor has a plurality of first slots formed therein and the cutting mechanism includes a plurality of first knives, each first knife is disposed to rotate from a first resting position to a second cutting position extending through a respective one of the plurality of first slots in the floor, and the pick-up assembly further comprises a plurality of first guide plates, wherein each of the plurality of first guide plates is disposed adjacent to a corresponding first side of one of the plurality of first slots.

In accordance with a fourth embodiment of the invention, the pick-up assembly further includes a plurality of second guide plates, wherein each second guide plate is disposed adjacent to a corresponding second side of one of the plurality of first slots so that at least a position of each first slot is disposed between the corresponding one of the first guide plates and the second guide plates.

Further objects, features and advantages of the present invention will become apparent for the Detailed Description of Preferred Embodiments, which follows, when considered together with the attached drawings.

DETAILED DESCRIPTION OF THE INVENTION

Figure 1:
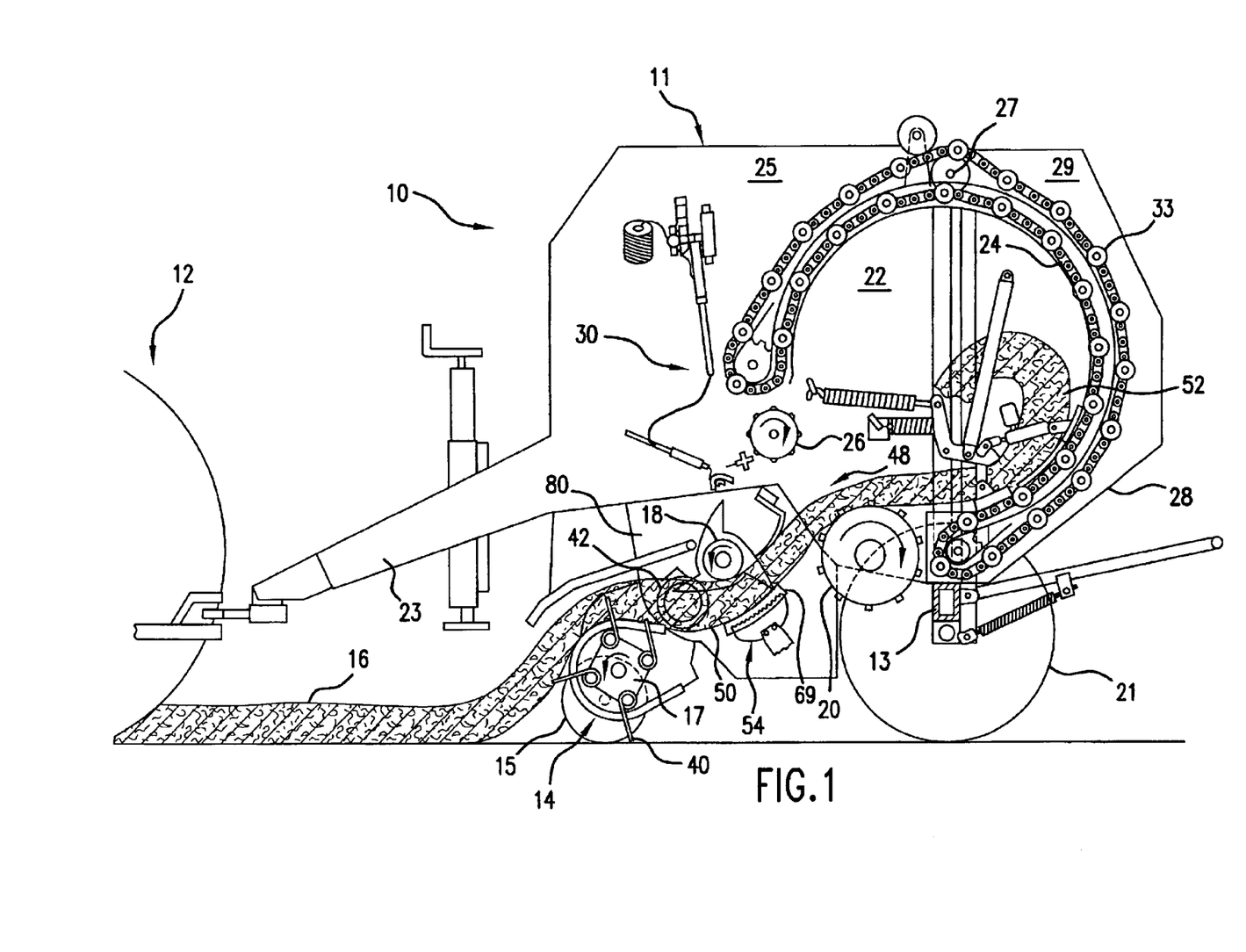
FIG. 1 is a cutaway side elevational view of a baler in accordance with the present invention.

The preferred embodiments of the invention will now be described with reference to the Figures in which like parts are indicated by like reference numerals. The apparatus of the present invention is a baler 10 as shown in FIG. 1 that includes a main frame or housing 11, and a bale forming chamber 22 formed inside of housing/frame 11, wherein the bale forming chamber is illustrated as a fixed bale forming chamber for forming a geometrical package out of cut crop material 16. The geometrical package of cut crop material formed in the bale forming chamber 22 is known as a "bale." The bale is formed by a bale forming mechanism such as a chain conveyer 24, also referred to as an "apron," that surrounds and defines a portion of the chamber 22. Apron 24 serves to rotate the cut crop material in the bale forming chamber 22 by using slats 33 of the apron 24 that engage and rotate the cut crop material, thereby moving the cut crop material about the bale forming chamber 22 to form the bale 52 as described in U.S. Pat. No. 6,164,050, which is incorporated herein by reference in its entirety. Preferably, the bale produced in the bale forming chamber 22 has a cylindrical shape. Although baler 10 is illustrated as a round baler, one skilled in the art would appreciate that the present invention can be practiced on balers that produce other bale shapes, such as by square balers, and can be practiced by round balers having a variable bale forming chamber.

Main frame 11 includes a main support beam 13 on which a pair of wheels 21 (only one shown) is rotatably affixed. A tongue 23 extends from a front portion of frame 11 to provide a conventional hitch connection for connecting to a tractor 12 or other work vehicle. Frame 11 also includes a pair of sidewalls 25 (only one shown) between which the bale forming chamber 22 extends. A pair of stub shafts 27 (only one shown) pivotally connect tailgate 28 to main frame 11. Tailgate 28 pivotally rotates about the stub shafts 27 from the closed position shown in FIG. 1 to an open position, as is conventionally known, so that a completed wrapped bale can be discharged to the ground for subsequent handling. Tailgate 28 includes a pair of tailgate sidewalls 29 (only one shown) that are coextensive with sidewalls 25.

Baler 10 includes a pick-up assembly 14 for picking up a cut crop material 16, such as straw, hay, and the like, from a field, and delivering it to the bale forming chamber 22. The pick-up assembly 14 is located forward of the bale forming chamber 22 and includes a pick-up apparatus 17, a pair of augers 42, a conveying feeder rotor 18, (also simply referred to as a "conveyer"), and a crop cutting mechanism 54 disposed in the rotor floor 50 of the pick-up assembly 14.

The pick-up apparatus 17 includes a plurality of tines 40 for catching and pulling the cut crop material 16 from the ground and into the pick-up assembly 14. Optionally, a pair of augers 42 are rotationally mounted in the pick-up assembly 14 and disposed to direct the cut crop material towards the center of the pick-up assembly. Conveying feeder rotor 18 receives the cut crop material from the pick-up apparatus 17 and augers 42 and conveys the cut crop material to the throat 48 of the bale forming chamber 22 while the baler 10 moves across a field.

The bale forming chamber 22 is defined by the coextensive sidewalls 25 and 29, apron 24, rotating floor roll 20, and rotating stripper roll 26. A rotating bale 52 is formed within the bale forming chamber 22 when cut crop material is fed into the chamber by the pickup assembly 14, and rotated by the bale forming mechanism, such as apron 24. When the bale 52 reaches a predetermined size, such as occurs in variable size chambers, or, in the alternative, when the bale 52 reaches a predetermined density, such as occurs in fixed size chambers, appropriate size or density sensors, respectively, indicate that the bale is ready to be wrapped. Subsequently, the baler 10 stops its forward motion so that a bale wrapping operation is performed by a bale wrapping assembly 30. After the bale has been wrapped by twine, plastic, netting and the like, the completed wrapped bale is discharged from the baler 10 when the tailgate 28 rotates into an open position as is conventionally known.

In accordance with the present invention, as shown in FIG. 1, cutting mechanism 54 is disposed in the rotor floor 50 of the pick-up assembly 14 so as to be positioned to operatively engage the stream of cut crop material 16 as it flows passed the cutting mechanism. As shown in FIGS. 2, 5a, 5b and 5c, the cutting mechanism 54 includes an array of knives 60 mounted on a rotatable elongated bar 56 so as to be movable from a protected, resting position (see FIG. 5b) to an extended, cutting position (see FIG. 5c).

Figure 2:
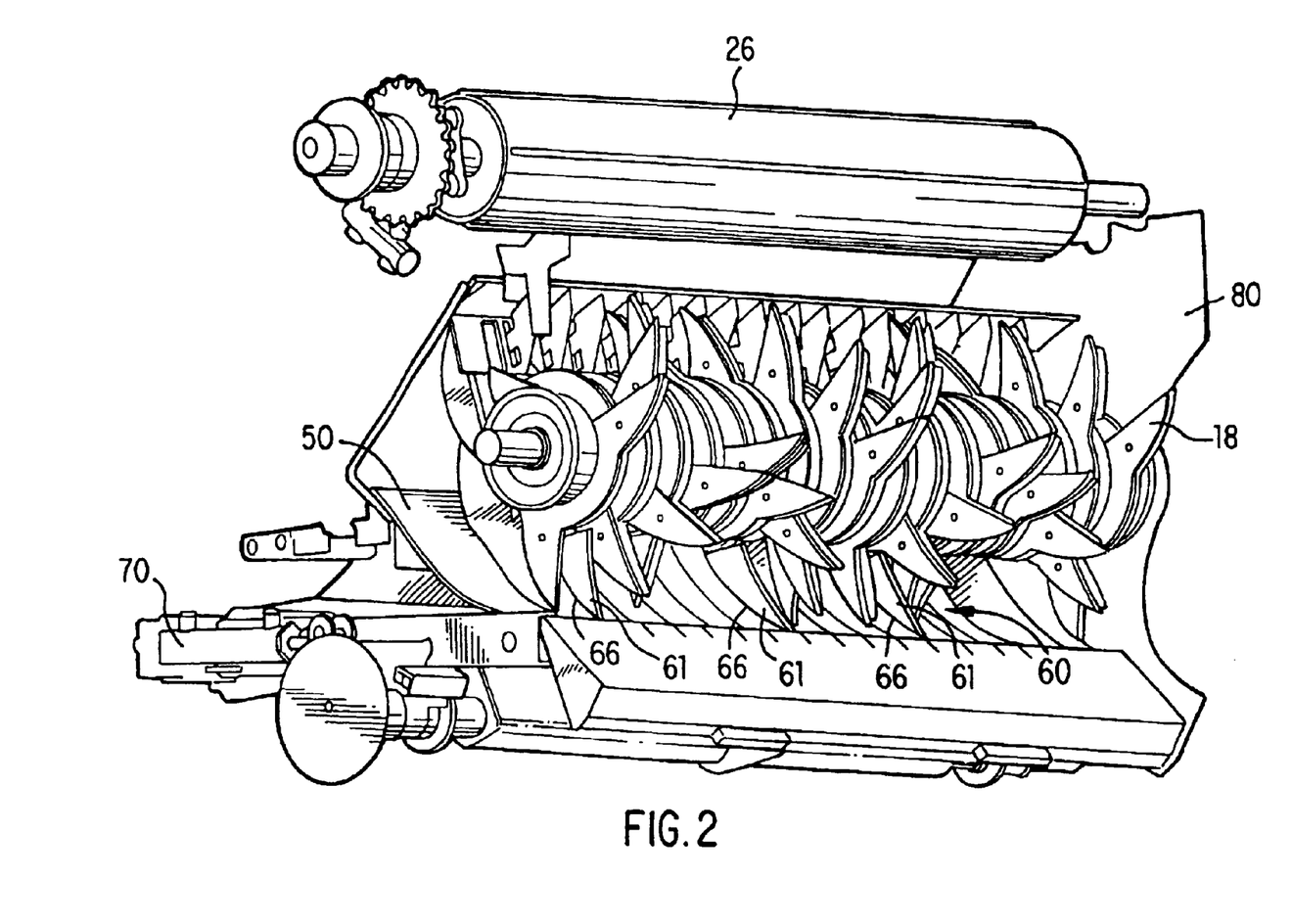
FIG. 2 illustrates a front perspective partial view of the knife array (three knives shown) in the floor of the pick-up assembly in accordance with the present invention.

Each knife 61 has a cutting edge 62 that is preferably serrated; however, non-serrated knife edges can also be used.

The rotor floor 50 of the pick-up assembly 14 is provided with an array of slots 65 formed therein, wherein each slot 66 is shaped and positioned so as to accommodate a corresponding one of the knives 61. In other words, each knife 61 is disposed in a respective one of the slots 65 so that as each knife 61 is rotated from the resting position to the cutting position, the knife moves through and extends through, its corresponding slot 66. To decrease the amount of free space around each knife 61, a plurality of guide plates 68, 69 are connected to the floor 50, preferably by welding. Decreasing the amount of free space around each knife 61 minimizes the likelihood of trash build-up and crop hair pinning around the knife. By diminishing or eliminating the likelihood of trash build-up or crop hair pinning, it is less likely that cut crop material will impact and trap any one knife 61 into its respective slot 66.

Guide plates 68 and 69 are shaped to conform to the shape of rotor floor 50. As evident from FIGS. 5b and 5c, guide plates 68, 69 are disposed in pairs adjacent to slot 66 so that slot 66 is located between guide plate 68 and guide plate 69. In this context, the term "adjacent" is meant to include locations that are nearby, next to, and even with the slot 66. In the embodiment of the figures, the guide plates 68 and 69 are even with the slot. Besides decreasing the amount of space surrounding each knife 61, guide plates 68 and 69 provide a support or guide for preventing twisting or lateral bending of each knife due to external torques applied to the sides of each knife by the stream of cut crop material 16.

Figure 4A:
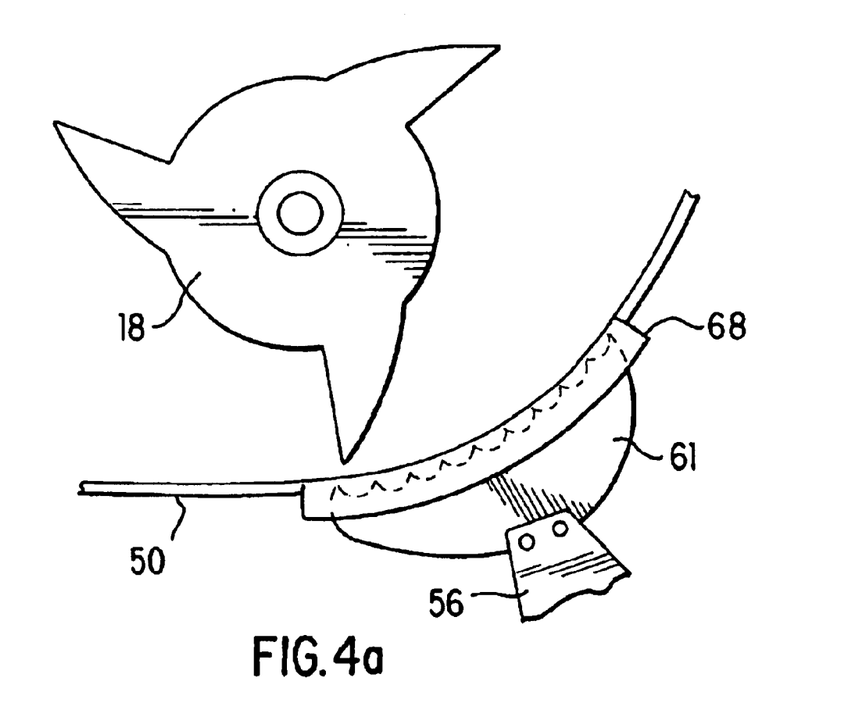
FIG. 4a schematically illustrates a side view of a crop cutting knife in the resting position.
Figure 4B:
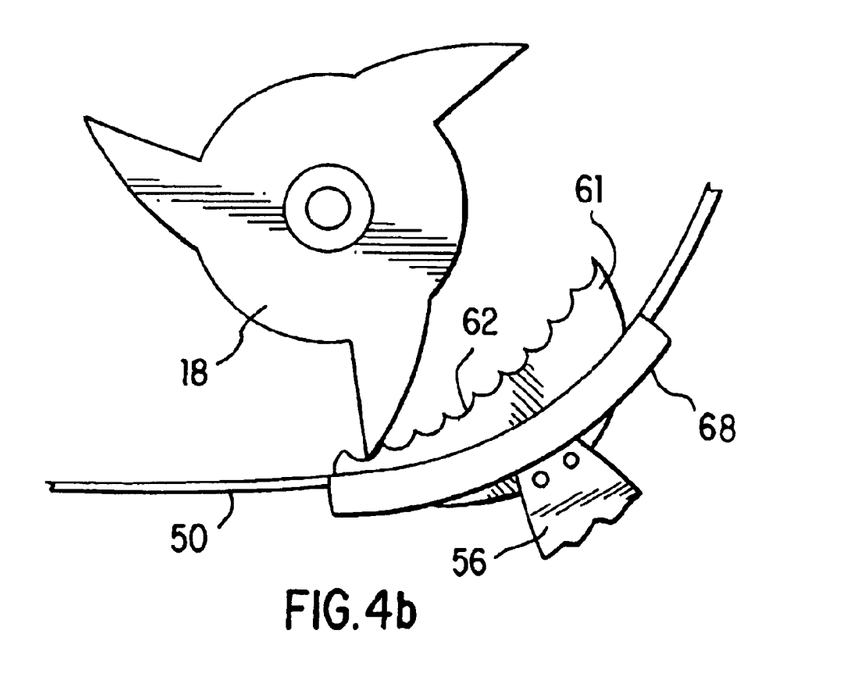
FIG. 4b schematically illustrates a cutaway side view of a crop cutting knife in the extended cutting position.
Figure 5A:
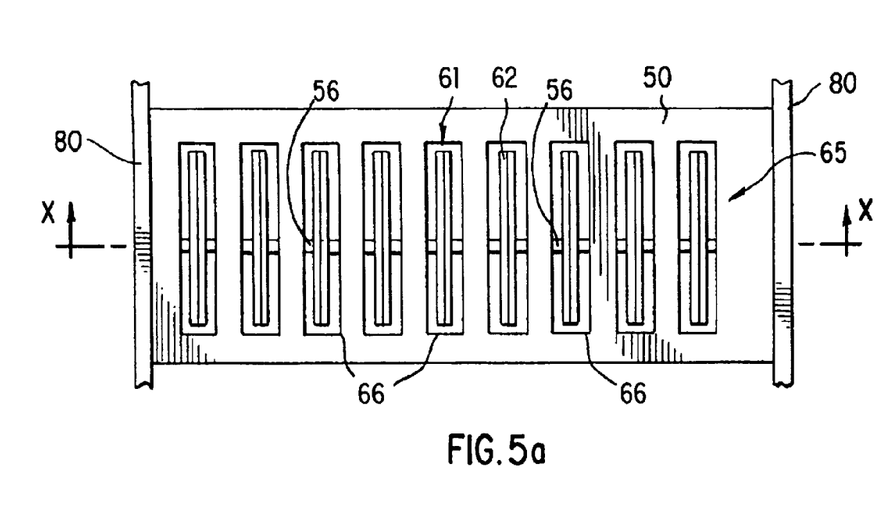
FIG. 5a schematically illustrates a plan view of the full knife array in the rotor floor.
Figure 5B:
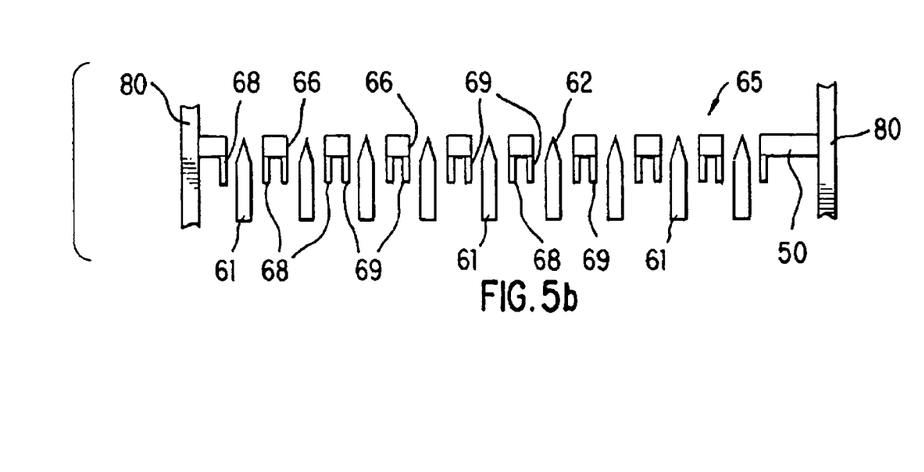
FIG. 5b schematically illustrates a sectional view along axis X—X of the full knife array in the rotor floor shown in FIG. 5a, with the knife array in the resting position.
Figure 5C:
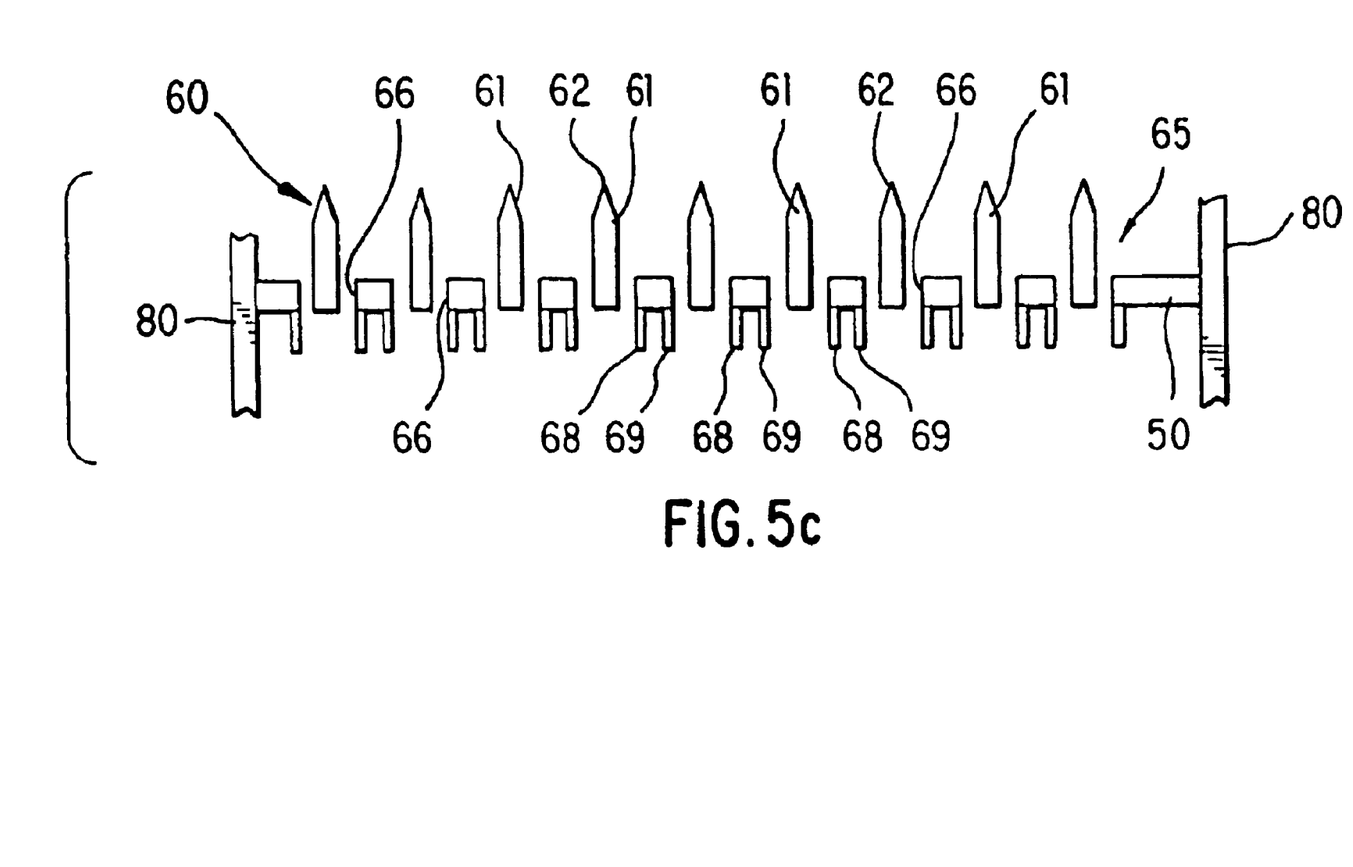
FIG. 5c schematically illustrates a sectional view along axis X—X as shown in FIG. 5b, but with the full knife array in an extended cutting position.

Each knife 61 is free to move in its respective slot 66 from a resting position below floor 50 as shown in FIGS. 4a and 5b to a cutting position, as shown in FIGS. 4b and 5c, wherein each knife 61 extends through its corresponding slot 66. When in the resting position, each knife 61 is stored safely below the rotor floor 50. When in the cutting position, the cutting edge 62 of each knife is positioned above floor 50 and facing into the flow of cut crop material 16. In this manner, the knife array 60 can be deployed so that cut crop material 16 is cut into even smaller pieces that are easier for animals to digest.

Figure 3:
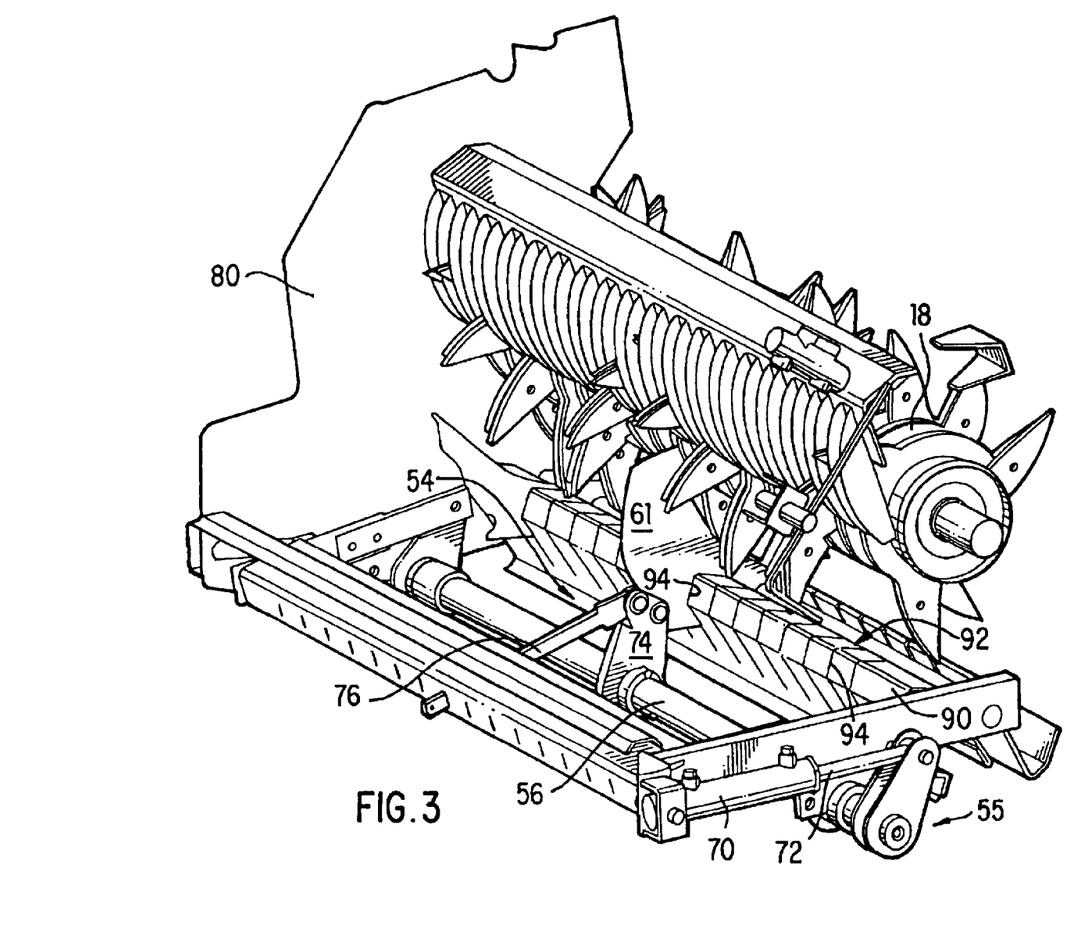
FIG. 3 illustrates a cutaway rear perspective partial view of the activating mechanism for the knife array.

In order to deploy the knives 61 into the cutting position, the cutting mechanism 54 is constructed to include an actuating mechanism 55. Actuating mechanism 55 includes a solenoid activated hydraulic cylinder 70 operatively connected to either a switch in the cab of tractor 12 or to an on board controller carried by tractor 12. Hydraulic cylinder 70 has a piston 72 mechanically connected to rotate elongated bar 56, which is rotatably mounted to the frame 80 of the pick-up assembly 14 as shown in FIG. 3. The actuating mechanism 55 also includes elongated bar 56 and a plurality of mounting members 74, one mounting member attached to each knife 61. As evident from FIG. 3, each knife 61 (only one illustrated in FIG. 3 for exemplary purposes) is attached to a mounting member 74, and each mounting member 74 is mounted on the elongated bar 56 so that rotation of bar 56 effects movement of the knives 61 through slots 66. In other words, as piston 72 is extended elongated bar 56 rotates clockwise so that each knife 61 is pushed through its respective slot 66 as it moves from the resting position to the cutting position. Then, as piston 72 is retracted back into the hydraulic cylinder 70 the elongated bar 56 is rotated counterclockwise thereby effecting movement of each knife 61 from the cutting position back to the resting position.

Sometimes one of the knives 61 encounters a large hard object such as a compact bolus of cut crop material, a stone, a piece of wood, or the like, and it is necessary that the knife be released to avoid damage. As shown in FIG. 3, each mounting member 74 is attached to a spring biased release bar 76. Generally, under normal operating conditions, each spring biased release bar 76 is biased by a spring mechanism (not shown) so that the release bar 76 keeps its respective knife 61 properly oriented on the elongated bat 56. When the knife 61 encounters a hard object that exerts a sufficient rearward force (i.e., a force that pushes the knife to move back towards the resting position), the respective mounting member 74 is constructed so as to slip relative to the elongated bar 56 so that the mounting member rotates counterclockwise on the elongated bar. Consequently, the spring biased release bar 76 is pushed rearward, and the knife 61 is retracted into its protective slot 66 as it moves back towards the resting position. As soon as the rearward force diminishes, the spring mechanism (not shown) pushes the spring biased release bar 76 forward again, the mounting member 74 slips in a clockwise directed on the elongated bar 56, and the knife 61 returns to the position (i.e., the cutting position) it would have been in if it were not for the rearward force.

To further stabilize each knife 61, the pick-up assembly 14 is provided with a secondary stabilization member 90 that is attached to pick-up assembly frame 80. Secondary stabilization member 90 is best seen in FIG. 3 because the rotor floor 50 has been omitted in this drawing so that the crop cutting mechanism 54 can be appreciated. Secondary stabilization member 90 is a bent metal plate configured with an array of slots 92 so that each slot 94 receives a respective knife 61. Although the secondary stabilization member 90 provides some degree of stabilization for each knife 61 of the crop cutting mechanism 54, it can be appreciated that the amount of stabilization is limited due to the location of the stabilization member 90 below the rotor floor 50 and proximate to a front portion of each knife 61. The guide plates 68 and 69 provide additional stabilization along the entire body of each knife 61, which provides a greater degree o stabilization. Furthermore, guide plates 68 and 69 make it less likely that errant cut crop material or trash build-up materials will fall through slots 66 and trap the knives 61 below the rotor floor 50. While the present invention has been described with reference to certain preferred embodiments, one of ordinary skill in the art will recognize that additions, deletions, substitutions, modifications, and improvements can be made while remaining within the spirit and scope of the present invention as defined by the appended claims.

What is claimed is:

1. An agricultural baler comprising:
    a bale-forming mechanism;
    a pick-up assembly disposed forward of the bale-forming mechanism to pick up a cut crop material;
    a conveying rotor disposed to receive cut crop material from the pick-up assembly and to move the cut crop material towards the bale forming mechanism;
    a floor having a plurality of first slots formed therein;
    a cutting mechanism including a plurality of first knives, wherein each first knife is disposed to rotate from a first resting position to a second cutting position extending through a respective one of the plurality of first slots in the floor,
    a plurality of first guide plates, wherein each of the plurality of first guide plates is disposed adjacent to a corresponding first side of each of the plurality of first slots;
    a plurality of second guide plates, wherein each of the plurality of second guide plates is disposed adjacent to a corresponding second side of each of the plurality of first slots so that at least a portion of each first slot is disposed between corresponding first and second guide plates; and a secondary stabilization member having a plurality of second slots formed therein, wherein each first knife is disposed to rotate from the first resting position to the second cutting position through a respective one of the plurality of second slots in the secondary stabilization member.

2. An agricultural baler as recited in claim 1, wherein each first knife is connected to a mounting member and each mounting member is mounted on a rotatable elongated bar, wherein the elongated bar is rotatably mounted to a frame of the pick-up assembly so that rotation of the elongated bar moves each first knife from the first resting position to the second cutting position.

3. An agricultural baler as recited in claim 2, wherein a hydraulic cylinder is connected to the elongated bar so that extension of a piston of the hydraulic cylinder effects rotation of the elongated bar.

4. An agricultural baler as recited in claim 1, wherein each first knife is connected to a release bar that exerts a force on the respective first knife.

5. An agricultural baler according to claim 1, wherein the first guide plate is even with the first slot.

6. An agricultural baler according to claim 1, wherein the first and second guide are even with the first slot.

7. An agricultural baler according to claim 1, wherein each of the plurality of first guide plates is even with a corresponding one of the first slots.

8. An agricultural baler according to claim 1, wherein each of the plurality of first and second guide plates is even with a corresponding one of the first slots.

* * * * *